3,002,320
PREPARATION OF SILICON MATERIAL
Henry C. Theuerer, New York, N.Y., assignor to Bell Telephone Laboratories, Incorporated, New York, N.Y., a corporation of New York
Filed Dec. 13, 1956, Ser. No. 628,186
5 Claims. (Cl. 49—85)

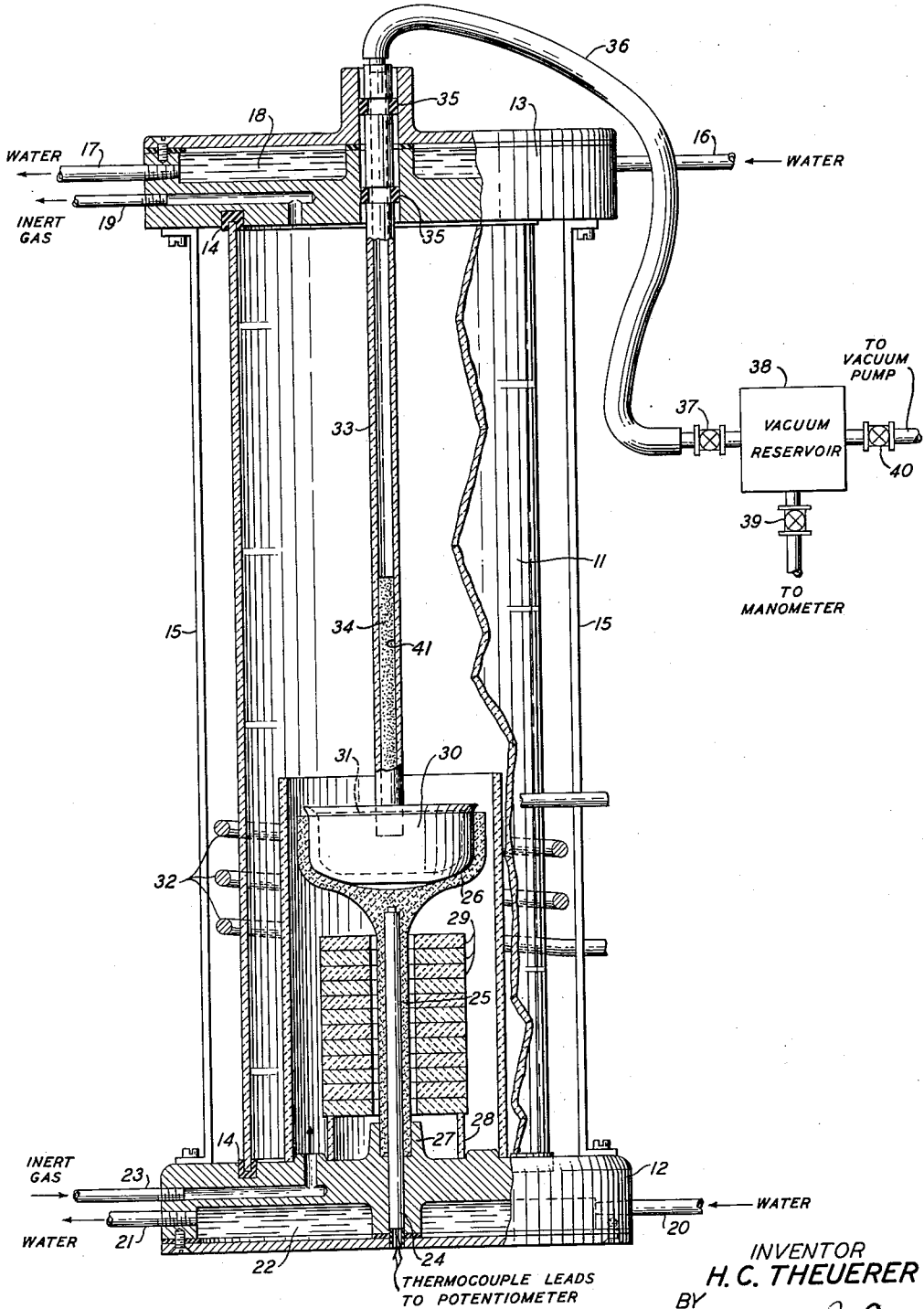

This invention relates generally to a method for casting ingots, and relates particularly to a method for casting ingots of silicon from a silicon melt.

For purifying silicon to a degree sufficient to render the material suitable for use as an extrinsic electrical semiconductive material in devices such as transistors, diodes, or photocells, for example, physical methods commonly supplement chemical purification steps used in the preparation of elemental silicon. One such physical method, zone refining, relies on the segregation of impurities in a silicon ingot by the passage of a molten zone along the length of the ingot. As described in the patent to W. G. Pfann, No. 2,739,088, granted March 20, 1956, differences in the solubilities of the impurities in liquid and solid silicon tend to concentrate the impurities in specific portions of the ingot, leaving more pure silicon in other parts of the ingot.

The application of H. C. Theuerer, Serial No. 326,561, filed December 17, 1952 describes a method of zone refining a vertically-suspended elemental ingot, a method whereby problems of contamination of the molten zone by a confining crucible are eliminated. For this method particularly, and for other processing techniques utilizing elemental silicon, it is often convenient to have the silicon in the form of an elongated ingot.

Because of several peculiarities, silicon is a material difficult to cast satisfactorily, particularly in the form of elongated ingots. Silicon is one of the few materials whose specific volume as a solid exceeds its specific volume as a liquid at the freezing point. That is, on solidifying from a melt at the freezing point, silicon will expand rather than contract on solidification as is common for most metals with the exception of a few alloys such as those commonly used for casting type. This behavior requires that, in casting, some means be provided for the free expansion of the freezing solid. For example, a directional solidification of the ingot may be brought about in such a way that as freezing progresses the unsolidified melt is free to adjust to volume changes taking place during solidification.

The tendency of silicon castings to adhere to a mold wall introduces further complication. Prolonged contact of the hot or molten silicon with a mold wall often permits reaction between the two, causing the ingot to adhere to the mold wall. The solidified silicon, on cooling from the freezing point, contracts at a rate different from that shown by the cooling mold. Because of adhesion of the solid to the mold, stresses may be set up, on cooling, sufficient to split or crack the cast ingot.

With silicon the problem of casting is still additionally complicated by the undesirability of contamination of the melt with the materials of the mold wall. As the degree of purity required in silicon is often exceptionally high, it is desirable to start refining methods, such as zone refining, on silicon already as pure as possible. If the casting of silicon ingots were indiscriminate, much subsequent purification might be required, or prior purification wasted, because of melt reaction with the materials of the mold wall during casting, resulting in melt contamination.

In consequence of these restrictions, prior art casting processes for silicon are few. The patent to H. C. Theuerer, No. 2,475,810, granted July 12, 1949, discloses a casting method using deformable silica crucibles.

In the method of that patent, the plasticity of the crucible used permits the crucible to adapt to the volume change in its silicon contents at the freezing point of silicon. To overcome the problem of adhesion, the silicon melt and silica mold are kept in contact at an elevated temperature to bring about devitrification of the silica mold. However, such overly prolonged contact may be conducive to contamination of the silicon melt by the materials of the wall during devitrification.

Another casting method for silicon uses quartz crucibles with extremely thin walls, of thickness less than 10 mils, and preferably less than 6 mils. Directional cooling is carried out. The crucibles or molds are sufficiently flexible to conform to changes in the volume of solid silicon cooling from its freezing point in the mold, even though there is adhesion of the ingot to the mold wall and the two materials have a different coefficient of expansion. The method, however, may be both inconvenient and expensive because of the requirement for the extremely thin-walled vessels made of a material worked only with difficulty at high temperatures.

By the methods of the present invention, casting may be done in molds made of a variety of materials, both metallic and non-metallic. There is no necessity for fragile or expensive equipment. Contamination of the melt is minimal, and good castings, neither cracked nor excessively piped—common defects resulting from the previously mentioned volume changes in silicon at the freezing point—are obtainable in lengths suitable for further processing by zone refining techniques. The method is one involving a rapid formation of the ingot with rapid solidification of the melt in the region of the mold wall. The reactive melt is cooled before it has an opportunity to react with the materials of the mold wall, and tendencies of the ingot to adhere to, or be contaminated by, the mold wall are minimized. Temperature control of the melt is used to balance the expansile and contracile forces in the melt so that the volume of melt poured closely matches the volume of the solid ingot obtained.

The accompanying drawing is a front elevation, partly in section, depicting a preferred apparatus for casting silicon using the principles of the present invention. In the apparatus shown in FIG. 1, tube 11, which may be of clear quartz conveniently about 3½ inches in diameter and 18 inches long is shown supported on base 12, conveniently machined of metal, and covered with cap 13, similarly conveniently fashioned of metal. Tube 11 is seated in base 12 and cap 13 on rubber gaskets 14, making gas tight seals between tube 11 and base 12 and cap 13 respectively. Supports 15, running between base 12 and cap 13 lend rigidity to the structure and permit adjustment of the fit of tube 11 on gaskets 14 in the base and cap.

Cap 13 is provided with inlet 16 and outlet 17 for running water which passes through cooling reservoir 18 in said cap. Outlet 19, leading from the interior of tube 11 through cap 13, conducts inert gases away from the interior of tube 11. An aperture pierces the center portion of cap 13 providing access to the interior of tube 11.

Similarly, base 12 is equipped with corresponding inlet 20, outlet 21, and cooling reservoir 22 for water, and inlet 23 for the introduction of gas to the interior of tube 11. Base 12 is also pierced by an aperture of sufficient diameter to hold shielded thermocouple 24 therein.

Thermocouple 24 extends upward through the aperture in base 12 into a well bored in stem 25 of cup 26. Said cup 26 and stem 25 may be integral piece as shown, or may be fitted together by means of a tapered connection. Stem 25 and cup 26 are preferably formed of graphite or another material subject to heating by high frequency induction. Said cup 26 and stem 25 are supported upright by insertion of stem 25 into fitting 27 machined on base 12, aided by one or more annular rings 28 and annular discs 29 surrounding stem 25. Said annular rings 28 and annular discs 29 can be conveniently formed of alundum or a similar ceramic heat-resistant material.

Within cup 26 is a second shallow container 30, made of material, such as quartz, suitable for holding molten silicon. A silicon melt 31 is held in said shallow container 30, and liquefied or retained in a molten condition by high-frequency induction heating coils 32 surrounding tube 11.

The drawing shows tube 33, preferably of quartz, extending from an aperture in cap 13 into melt 31. Some silicon 34 is shown within tube 33. The interior of the tube may be coated with a thin film of finely divided silica 41 to minimize adhesion between silicon 34 and tube 33. Said tube passes through gas-tight flexible rubber seals 35 seated in the aperture of cap 13, and is connected by flexible vacuum tubing 36 through stopcock 37 to vacuum reservoir 38. Said reservoir 38 is itself dually connected by stopcocks 39 and 40 to a manometer and a vacuum pump respectively, said manometer and pump not being shown. Use of the apparatus shown in the drawing for casting silicon according to the method herein described immediately below.

With tube 33 devoid of silicon and raised above the level of the contents of container 30, tube 11 is seated on gaskets 14 in cap 13 and base 12 to give an essentially gas tight seal. Water is passed through cooling reservoirs 18 and 22 using coupled inlets and outlets 16 and 17 and 20 and 21 respectively. With an inert gas passing through inlet 23 into tube 11 and emerging from outlet 19, high frequency current is passed through coils 32, heating cup 26, and causing silicon contained in container 30 to form silicon melt 31.

Stopcock 37 is closed and stopcocks 39 and 40 are opened, and a vacuum is produced in reservoir 38, the degree of vacuum produced being checked by the manometer. When melt 31 is at a temperature suitable for casting, as determined by an optical pyrometer or by potentiometer readings of thermocouple 24, tube 33 is quickly submerged beneath the liquid level of melt 31 and stopcock 37 is opened. The difference in pressure within and without tube 33 causes molten silicon 31 to rise rapidly in tube 33, forming cast ingot 34 therein.

Where melt 31 has small volume, the tip of tube 33 is preferably "necked," or drawn down to a finer diameter than portions of the tube not submerged in the melt. Forming the tip decreases the mass of cold material thrust into the melt, thus reducing the possibility of a premature solidification of portions of the melt before the melt is drawn into tube 33. To discourage fountain effects which may be shown by the melt in passing from a constricted portion of tube 33, where its velocity is high, into wider portions of tube 33, the fine-drawn tip is usually submerged in the melt 31 till the level of the melt surface reaches the wide portions of tube 33. The entrapment of voids within the casting is thereby averted.

For proper operation of the casting technique, two conditions are preferably to be met. First, the temperature of the melt from which the silicon ingot is cast should be such that the volume contraction of the melt undergone by cooling from the casting temperature to the freezing point is essentially completely balanced by the expansion undergone by the melt on freezing. Symbolically, $$[(V_s)_{T_f} - (V_l)_{T_f}] - [\bar{\rho}(T_c - T_t)] = 0$$

where $(V_s)_{T_f}$ = specific volume of solid silicon at the freezing point $T_f$
$(V_l)_{T_f}$ = specific volume of liquid silicon at the freezing point, $T_f$
$\bar{\rho}$ = average specific thermal coefficient of expansion in the temperature range above the freezing point, $T_t$
$T_c$ = casting temperature
$T_f$ = temperature of freezing point of silicon.

On reflection, it will be seen that the requirement imposed above is that, at the casting temperature, the volume of the silicon melt to be cast equal the volume of the solid cast ingot at the freezing point.

The second condition to be met for the best casting is that cooling and solidification of the melt at the mold wall be sufficiently rapid that no time for substantial reaction of the melt with the mold wall elapse before solidification of the melt to the essentially non-reactive solid silicon.

Satisfaction of the first condition mentioned above assures that undesirable volume effects usually observed in silicon casting, due to the solidification of the silicon, will be minimized. If too high a casting temperature is employed, then the quantity $$[(V_s)_{T_f} - (V_l)_{T_f}] - [\bar{\rho}(T_c - T_t)]$$

will be negative. The ingots cast from such a temperature will be subject to piping, as the contraction due to cooling to solidification will exceed the expansion undergone on solidification.

Conversely, if the ingots be cast from a temperature lying too closely above the freezing point, expansion will exceed contraction, that is, $$[(V_s)_{T_f} - (V_l)_{T_f}] - [\bar{\rho}(T_c - T_t)] > 0$$

and rupture of the mold wall may ensue.

The temperature at which casting is best performed has been determined as one about 60° C. to 70° C. above the silicon freezing point. The latter temperature has been reported as 1420° C., putting the preferred casting temperature in a range extending from about 1480° C. to 1490° C. Exact determination of the preferred casting temperature is difficult. Readings taken on the melt with an optical pyrometer may be uncertain by the errors inherent in calibration of the instrument. Further, the melt is of necessity surrounded by a container keeping an inert or nonoxidizing atmosphere over the melt. Corrections for the absorption losses of these containers or intervening transparent layers must be made, and these corrections may introduce error. Pyrometer readings, further, will measure only the surface temperature of the melt, which may differ slightly from the temperature of the bulk of the material being cast.

Temperature measurements made with thermocouples may be more accurate. Even here, however, the thermocouple cannot be immersed directly in the melt. When thermocouples are located near the melt, the validity of their readings as indicating melt temperature is dependent on establishing thermal equilibrium between melt, thermocouple, and all intervening matter.

The best temperature readings indicate that the casting method herein described is most effective when the melt temperature is between about 1470° C. and 1500° C. A preferred range of temperatures lies between 1480° C. and 1490° C., and the best castings have been obtained with a temperature reading of about 1485° C. It is to be noted that these temperatures are approximate, because of the experimental difficulties described above which prevent accurate temperature readings. In constructing and using casting apparatus of the kind described, an empirical calibration of thermometric devices will usually be required, with the operator determining for himself which observed temperature readings are correlatable with the best castings obtained by him. In general, it is best to approach the preferred casting temperature from temperatures higher than the preferred temperature. Castings made in such a manner may be slightly piped, but useable and the danger of shattering the mold is averted.

The desire for fast cooling of the melt, before attack of the mold walls by the molten material, expresses itself in the design of the casting apparatus. For cooling to be quick at the mold walls, the mold must be made sufficiently thick to absorb both the heat liberated by cooling the melt to the freezing point and the liberated heat of fusion released on solidification of the melt. The heat $\Delta H$ absorbed by the mold wall is related to the mass $m$ of the mold wall, the temperature change $\Delta T$ of the mold wall, and $\overline{C}p$, the average specific heat capacity of the material over the temperature range $\Delta T$, by $$\Delta H = m\overline{C}p\Delta T$$

To maximize the heat absorbed by the mold wall while minimizing the temperature increment, either the mass of the wall $m$ may be large or the wall made of a material of high average specific heat capacity. Minimization of the temperature increment $\Delta T$ insures that the mold wall remains cool in comparison with the melt temperature. The greater the temperature gradient between the cool mold wall and the hot melt, the greater the rate of heat flow from melt to wall, which is the condition to be desired.

As requiring the material composing a mold to be of high specific heat may introduce too much limitation on the choice of convenient mold materials, the maximization of heat absorption with minimum temperature increment in the mold wall is most usually, and most conveniently, done by varying the mass $m$ of the mold by making the mold wall thicker or thinner.

Materials suitable for mold walls, for example, may be either metallic or ceramic. The major requirement is that the materials be cold, relative to the melt being cast, and capable of rapidly absorbing heat lost by the melt. Quartz is a preferred material since it not only satisfies the requirement of being a thermal sink, but in addition is transparent, permitting viewing of the casting process. Further, quartz contains a minimum of impurities for silicon, lowering the danger of contamination of the melt if there is slight reaction between the melt and the mold wall. When quartz is used, a wall thickness between 20 mils and 40 mils, or between about ½ millimeter and 1 millimeter, gives good results for casting silicon ingots about 380 mils in diameter. Thicker mold walls give equally good, or better, results. Thinner mold walls may be used if supplemented by some exterior cooling source, such as water-carrying coils. If silicon ingots of large diameter are desired, cooling coils supplementing the cooling capacity of the mold are better than the expedient of thickening the mold wall. With cooling coils, thin metal-walled molds may be especially suitable. A metal mold with a wall thickness of at least 10 mils may be used, and metal molds with wall thicknesses of 5 mils or more may be used if water cooled. When using metal molds, the melt into which the mold is dipped may be so cooled by contact with the mold as to solidify and plug the mold. A ceramic extension of the metal mold may, however, be used to draw up the melt from its crucible into the metallic portions of the mold, thereby avoiding contact of the cold metal with the pool of melt. As a mold material, copper would be of special utility because of its excellent heat conductivity.

Since cooling at the mold walls is intended to be a rapid process, cooling of the cast ingot and solidification of the silicon melt will be processed proceeding, with time, from the mold wall radially inward to the center of the ingot. As solidification will commence immediately in those portions of the silicon melt which first contact the mold, casting of the entire ingot should be accomplished rapidly while a fluid core still remains beneath silicon solidified at the mold wall. Access to more interior portions of the mold may be blocked by solidified silicon in the mold if casting is not rapid.

Using the preferred apparatus shown in the drawing, rapid casting has been done by using a vacuum technique, in which a difference in pressure within and without the mold has been utilized to force the silicon melt into the mold with rapidity. Other means, such as a gravity flow technique in which silicon is poured through the top of a mold, are also feasible, though perhaps not as convenient. The vacuum method, for example, eliminates the problems encountered with the gravity method in pouring a melt into a constricted mold opening. Control over the ingot length can be fairly easily maintained by regulation of the pressure differential inside and outside the mold. Travel up the mold is sufficiently rapid that an interior fluid channel remains to give access to upper portions of the mold even though solidification is proceeding at the mold walls, inwardly to the center, in all portions of the mold anterior to that receiving the freshest charge of molten material. Any manner of similarly forcing the silicon into the mold within a short time period, before complete solidification has occurred, is equally satisfactory. For example, a technique using differential pressure, but no vacuum, can be adapted with ease to the apparatus shown in the drawing.

In the use of a vacuum technique, silicon has been observed to solidify immediately at a quartz mold wall, though a core of liquid silicon may remain within the interior of the casting for as long as 10 seconds. If the liquid core is withdrawn from the mold during this period, a silicon pipe will be produced within the mold. Such a withdrawal of liquid material from the interior of the casting may be done, for example, by equalizing pressure within and without the mold and permitting the liquid silicon to flow from the mold under gravity's influence. By control of the time interval for which the melt is permitted to stay within the mold, the thickness of the pipe wall may be predetermined. Repeated introductions of the melt into the mold, with withdrawal of residual unsolidified silicon, can also be used to build up silicon pipes having a desired wall thickness and inner diameter.

A preferred technique for casting silicon ingots is described in the example which follows.

*Example 1*

In an apparatus similar to that shown in the figure, a charge of 58 grams of silicon, in the form of crystallites, was placed in a hemispherical quartz cup, similar to container 30, having an outer diameter of two inches.

A stream of gaseous helium was passed through the sealed apparatus from inlet 23 to outlet 19. Induction coils 32, surrounding a 3½ inch diameter quartz tube 11 in the region of the silicon charge, were charged with current of a frequency of 450 kilocycles. After heating for a period of about 10 minutes, after which period the silicon was molten, duct 19 was closed and the flow of helium routed through the apparatus from duct 23 through tube 33 to the vacuum pump. This reverse flow of gas sweeps vapors of $SiO_2$ and $SiO$ from the surface of the molten silicon. These compounds may be present due to interaction of the melt with quartz container 30, or as an original contaminating film on the silicon used to charge the apparatus. The vapors are readily visible as a white "smoke" and coat the interiors of tubes 11 and 33 with a thin film of solid. Deposition of this film, while not necessary to the process, aids in the prevention of sticking of the melt to the mold wall. If local "hot spots" develop during the casting process, reaction of the hot melt in these regions will be with the $SiO_2$ film coating the mold, rather than with the mold wall itself, and sticking of the melt to the wall will be averted.

When no more "smoke" was seen to arise from the melt, the helium flow was once more changed to pass from duct 23 to duct 19 as it had initially. With stopcock 37 closed, vacuum reservoir 38 next was evacuated until a pressure differential of about 6 centimeters of mercury was observed between reservoir 38 and the pressure, approximately atmospheric, within tube 11.

After observation of a thermocouple reading of 1485° C. for the melt temperature, tube 33 was immersed in silicon melt 31 as stopcock 37 was partially opened. The rise of silicon in tube 33 was controlled, by regulation of the stopcock 37, so that an ingot about 20 centimeters long was formed within about 2 seconds. Too rapid opening of vacuum reservoir 38 to the silicon melt was avoided to prevent "bouncing" of the melt. The rise of the melt in the mold should be steady.

With a quartz mold tube about 0.40 inch in inside diameter and about 20 mils thick, a pressure differential of 6 centimeters of mercury produced a silicon casting 23.5 centimeters long.

Though specific embodiments have been shown and decribed herein, it is to be understood that they are illustrative only and are not to be construed as limiting the scope and spirit of the invention.

What is claimed is:

1. The method of casting silicon ingots which comprises introducing molten silicon at a temperature between 1470° C. and 1500° C. into an elongated mold completely closed over its entire length so as to result in an elongated melt in contact with the said mold at substantially the entire surface of the said melt, and rapidly reducing the temperature of said melt to minimize the time of liquid-solid contact with said mold, whereby the volume contraction of said melt on cooling is essentially balanced by the volume expansion of said melt on freezing.

2. The method in accordance with claim 1 wherein said molten silicon is forced into said mold by means of a pressure difference within and without said mold.

3. The method in accordance with claim 1 wherein the mold is a silica tubing having as a coating a thin film of finely divided silica.

4. The method in accordance with claim 1 wherein the walls of the said mold are sufficiently thick to act as an appreciable heat sink thereby accelerating cooling of the said melt.

5. The method in accordance with claim 1 wherein the mold is cooled by a fluid coolant.

References Cited in the file of this patent

UNITED STATES PATENTS

| | | |
|---|---|---|
| 2,425,666 | Barnes | Aug. 12, 1947 |
| 2,443,542 | Ohl | June 15, 1948 |
| 2,475,810 | Theuerer | July 12, 1949 |
| 2,539,625 | Juppenlatz | Jan. 30, 1951 |
| 2,631,356 | Sparks et al. | Mar. 17, 1953 |
| 2,667,722 | Jenkins | Feb. 2, 1954 |
| 2,735,138 | Luehm et al. | Feb. 21, 1956 |

FOREIGN PATENTS

| | | |
|---|---|---|
| 200,405 | Australia | July 21, 1955 |
| 762,982 | Great Britain | Dec. 5, 1956 |